(12) United States Patent
Bohn et al.

(10) Patent No.: US 10,391,830 B2
(45) Date of Patent: Aug. 27, 2019

(54) INTEGRATED AIR-SUPPLY UNIT

(71) Applicant: Continental Teves AB & Co. oHG, Frankfurt (DE)

(72) Inventors: Joachim Bohn, Hundsangen (DE); Christian Courth, Frankfurt (DE); Uwe Folchert, Lauenau (DE); Christoph Voss, Frankfurt (DE); Michael Zydek, Frankfurt (DE); Dierk Hein, Wedemark (DE); Hinz Axel, Neu-Anspach (DE); Christian Witala, Hannover (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 376 days.

(21) Appl. No.: 15/304,761

(22) PCT Filed: Apr. 17, 2015

(86) PCT No.: PCT/EP2015/058409
§ 371 (c)(1),
(2) Date: Oct. 17, 2016

(87) PCT Pub. No.: WO2015/158904
PCT Pub. Date: Oct. 22, 2015

(65) Prior Publication Data
US 2017/0036505 A1 Feb. 9, 2017

(30) Foreign Application Priority Data

Apr. 17, 2014 (DE) .................. 10 2014 207 509

(51) Int. Cl.
*B60G 17/052* (2006.01)
*B60G 17/015* (2006.01)
(Continued)

(52) U.S. Cl.
CPC ..... *B60G 17/0523* (2013.01); *B60G 17/0155* (2013.01); *B60G 17/056* (2013.01);
(Continued)

(58) Field of Classification Search
CPC ............ B60G 17/0523; B60G 17/0155; B60G 17/056; B60G 2202/152; B60G 2600/66;
(Continued)

(56) References Cited

U.S. PATENT DOCUMENTS

| | | | |
|---|---|---|---|
| 4,738,454 A * | 4/1988 | Watanabe | B60G 17/0408 280/124.16 |
| 4,756,548 A * | 7/1988 | Kaltenthaler | B60G 17/0155 280/5.501 |

(Continued)

FOREIGN PATENT DOCUMENTS

| | | |
|---|---|---|
| DE | 102008045213 A1 | 3/2010 |
| DE | 2012005345 | 6/2013 |

(Continued)

OTHER PUBLICATIONS

German Search Report dated Jan. 1, 2015 for corresponding German Patent Application No. 10 2014 207 509.2.
(Continued)

*Primary Examiner* — Drew J Brown

(57) ABSTRACT

The invention relates to an integrated air-supply unit, in particular for air-suspension systems for motor vehicles, said unit comprising an air compressor having an electric motor and an air dryer. The air compressor together with the electric motor, air dryer and a number of pneumatic connections form a functional unit.

14 Claims, 4 Drawing Sheets

(51) Int. Cl.
  *B60G 17/056* (2006.01)
  *F04B 27/00* (2006.01)
  *F04B 27/04* (2006.01)
  *F04B 35/04* (2006.01)
  *F04B 53/10* (2006.01)
  *F04B 53/16* (2006.01)

(52) U.S. Cl.
  CPC ............ *F04B 27/005* (2013.01); *F04B 27/04* (2013.01); *F04B 35/04* (2013.01); *F04B 53/10* (2013.01); *F04B 53/16* (2013.01); *B60G 2202/152* (2013.01); *B60G 2500/201* (2013.01); *B60G 2500/203* (2013.01); *B60G 2600/66* (2013.01)

(58) Field of Classification Search
  CPC ........ B60G 2500/201; B60G 2500/203; F04B 53/16; F04B 27/005; F04B 27/04; F04B 35/04; F04B 53/10
  See application file for complete search history.

(56) References Cited

U.S. PATENT DOCUMENTS

| | | | | |
|---|---|---|---|---|
| 5,467,595 | A * | 11/1995 | Smith | B60G 17/052 280/124.16 |
| 5,600,953 | A * | 2/1997 | Oshita | B60G 17/0523 60/453 |
| 5,678,900 | A | 10/1997 | Blanz | |
| 5,711,150 | A | 1/1998 | Oshita et al. | |
| 5,855,379 | A * | 1/1999 | Buma | B60G 17/016 280/124.158 |
| 6,074,177 | A * | 6/2000 | Kobayashi | F04B 39/16 417/313 |
| 6,726,224 | B2 * | 4/2004 | Jurr | B60G 17/0523 280/124.16 |
| 7,100,372 | B2 * | 9/2006 | Ohshita | F04B 39/16 417/313 |
| 7,441,789 | B2 * | 10/2008 | Geiger | B60G 17/0155 280/124.157 |
| 7,484,747 | B2 * | 2/2009 | Geiger | B60G 17/0155 280/124.157 |
| 7,552,932 | B2 * | 6/2009 | Matern | B60G 17/0155 280/124.16 |
| 7,905,557 | B2 * | 3/2011 | Frank | B60T 8/327 137/613 |
| 9,199,524 | B2 * | 12/2015 | Stabenow | B60G 17/0525 |
| 9,834,053 | B2 * | 12/2017 | Frank | B60G 17/0155 |
| 10,017,025 | B2 * | 7/2018 | Reuter | B60G 11/30 |
| 10,137,751 | B2 * | 11/2018 | Berg | B60G 17/0432 |
| 2006/0006733 | A1 * | 1/2006 | Geiger | B60G 17/0157 303/3 |
| 2009/0309413 | A1 * | 12/2009 | Bensch | B60T 8/362 303/20 |
| 2013/0255787 | A1 | 10/2013 | Frank et al. | |
| 2013/0318954 | A1 * | 12/2013 | Frank | B60G 17/0155 60/407 |
| 2013/0320639 | A1 | 12/2013 | Frank et al. | |

FOREIGN PATENT DOCUMENTS

| | | |
|---|---|---|
| DE | 102012006382 A1 | 10/2013 |
| JP | S60252012 | 5/1985 |
| JP | S6483867 | 3/1989 |
| JP | H05187356 A | 7/1993 |
| JP | H7151431 | 6/1995 |
| JP | H08151978 | 6/1996 |
| JP | H0942157 A | 2/1997 |
| JP | 10128036 | 5/1998 |
| JP | H11264375 | 3/1999 |
| JP | 2005282519 A | 10/2005 |
| JP | 2013144503 A | 7/2013 |

OTHER PUBLICATIONS

International Search Report and Written Opinion dated Jul. 15, 2015 from corresponding International Patent Application No. PCT/EP2015/058409.

International Preliminary Report on Patentability dated Oct. 27, 2016 for corresponding International Patent Application No. PCT/EP2015/058409.

Japanese Office Action dated Oct. 30, 2017 for corresponding Japanese Patent Application No. 2016-562875.

* cited by examiner

INTEGRATED AIR-SUPPLY UNIT

TECHNICAL FIELD

The invention relates to an integrated air supply unit, in particular for air suspension systems for motor vehicles comprising an air compressor having an electric motor and an air dryer, wherein the air compressor together with an electric motor, the air dryer and multiple pneumatic connectors form a functional unit.

BACKGROUND

DE 102005030726 A1 discloses an air suspension system for vehicles, said air suspension system comprising the necessary components of current air suspension systems. Said air suspension system comprises a compressor, an air dryer, a pressure storage device and also various valves and compressed air lines. Furthermore, the air suspension system comprises pressure sensors and is controlled by way of a control device.

The main components of an air supply for air suspension systems in accordance with the prior art and comprising air compressors, valves and a control device are usually housed separately in the vehicle decoupled from one another as far as vibration technology is concerned. The components are connected by way of dedicated pneumatic and electrical lines that save little space, which leads to a high application expenditure and to high costs.

When supplying the air to air suspension systems for motor vehicles, 1 or 2 stage compressor concepts having linear pistons are usually used as compressors. Such compressors are mostly driven by way of an electric motor and comprise a crankcase embodied from a synthetic material or die-cast aluminum, a cylinder having a cylinder head embodied from a die-cast aluminum and a dryer unit embodied from synthetic material. In addition, one or multiple valves, for example inlet valves or outlet valves, are attached to the cylinder head. The motor control of the electric motor is generally controlled by way of mechanical relays and is not installed on the compressor, which in turn leads to additional lines.

Furthermore, combined air supply units for air suspension systems are known, said combined air supply units are however mostly used in the case of simple rear-axle level regulating systems. The valves are installed together with the control device on a compressor. Even in the case of this embodiment, it is necessary for the components to be connected in an inconvenient manner by way of further lines and this niche application likewise does not consequently facilitate an optimal production in terms of cost.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The object of the invention is therefore to provide a compact air supply unit for two-axle or four-axle air suspension systems that can be produced in a cost-effective manner and occupies less construction space.

The object of the invention is achieved with the features of the independent claim.

In accordance with the invention, a functional unit is formed by means of integrating the components, air compressor having an electric motor, air dryer, pneumatic valves and electronic control device. The core of this functional unit is a pneumatic block on which all the further components are arranged. This pneumatic block includes one part of pneumatic valves and their mating part is arranged in an electronic control device. Furthermore, the electric motor and the air dryer are arranged on the pneumatic block. Pneumatic connectors are provided on the pneumatic block so as to connect further components, for example a pressure storage device. A compact structural unit is thus produced that is suitable for supplying air to air suspension systems for motor vehicles.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
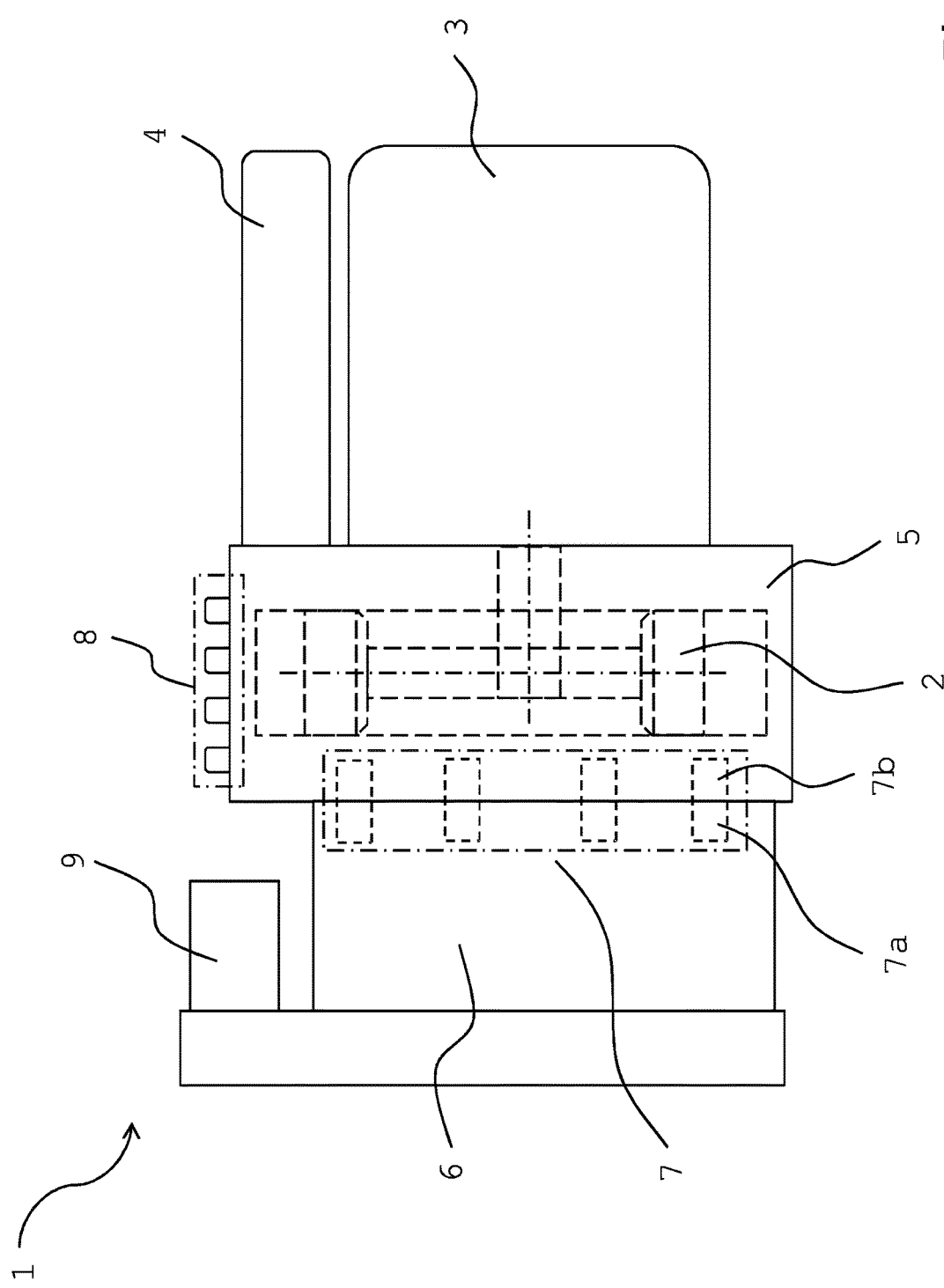
FIG. 1 illustrates an integrated air supply unit for an air suspension system for motor vehicles.

FIG. 1 illustrates schematically an integrated air supply unit 1 for an air suspension system for motor vehicles. An air compressor 2 is located within the pneumatic block 5, said air compressor being driven by way of an electric motor 3 that is attached to the front-side. Furthermore, an air dryer 4 is attached to the front side.

The pneumatic block 5 comprises receiving arrangements (not further illustrated) for individual components. Multiple pneumatic valves 7 are indicated schematically, said valves being arranged within the pneumatic block 5 and arranged with respect to one another in a matched manner in the electronic control device 6.

Drive units 7a of the pneumatic valves 7 comprising a core, sleeve, armature, resilient element and seal seat are integrated in the pneumatic block 5. Magnetic valve coils 7b of the pneumatic valves 7 are integrated in the electrical control device 6. Drive units 7a and magnetic valve coils 7b are suitably inserted into one another.

In addition, the pneumatic block 5 includes ducts (not illustrated) that function as pneumatic lines. These pneumatic lines connect the air compressor 2, air dryer 4, pneumatic valves 7 and pneumatic connectors 8 to one another. The pneumatic connectors 8 are arranged in the corresponding receiving arrangements of the pneumatic block 5 and are used to connect said pneumatic block to further components of an air suspension system such as for example a pressure storage device.

In addition to one part of the pneumatic valves 7, the electronic control device 6 includes an electronic connector 9. The integrated air supply unit 1 is completely connected by way of this connector to the vehicle electrical system and can thus be configured and selected. The electric motor 3 and pneumatic valves are controlled by way of the electronic control device 6.

Furthermore, a pressure sensor (not further illustrated) is integrated in the electrical control device and is electrically contacted by the control device. The integrated air supply unit 1 includes further sensors that are not further illustrated, for example acceleration sensors and temperature sensors.

Figure 2:
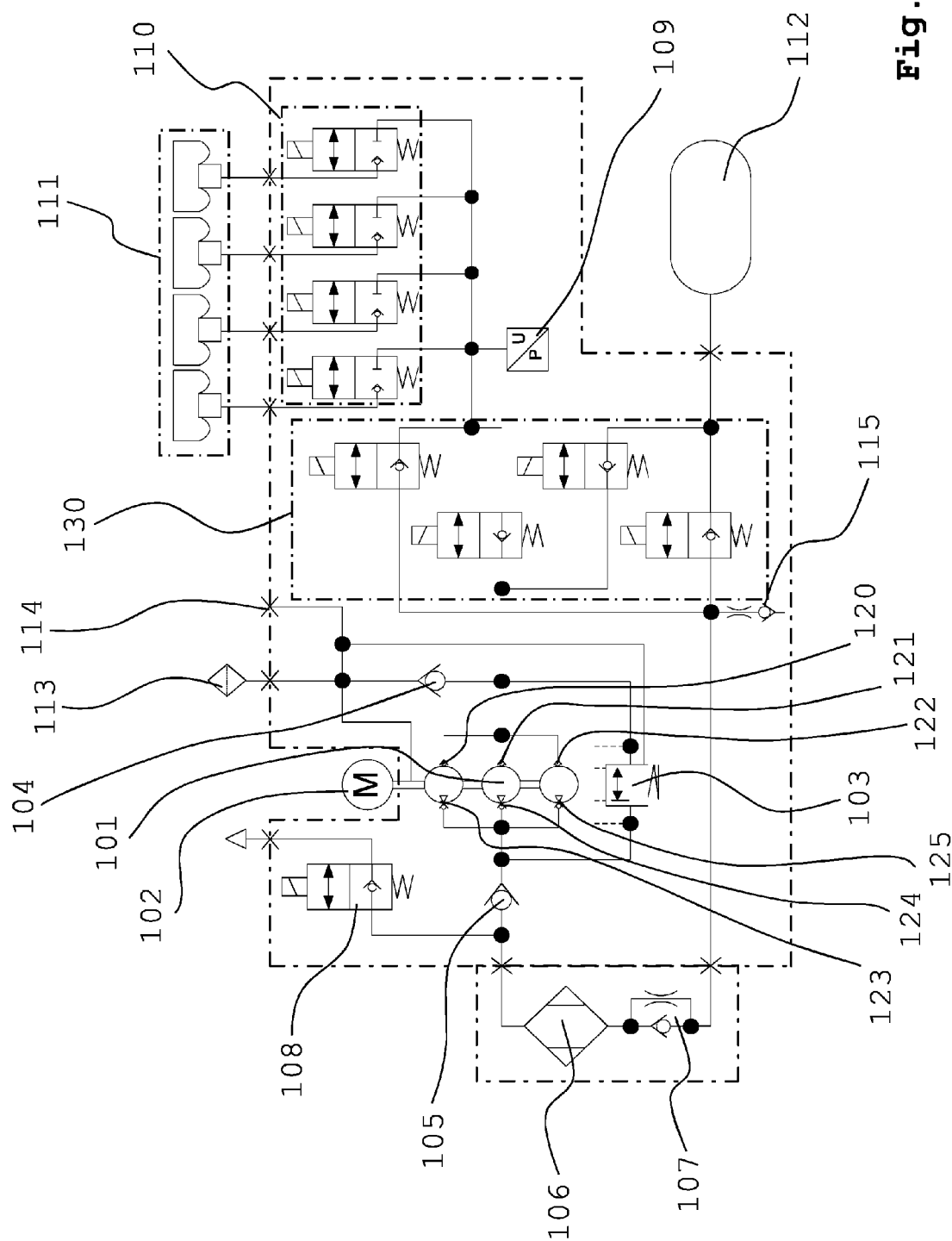
FIG. 2 illustrates a pneumatic circuit diagram of an air suspension system having a three-cylinder star compressor.

FIG. 2 illustrates a pneumatic circuit diagram of an air suspension system having a three-cylinder star compressor 101. The three-cylinder star compressor 101 is driven by way of the electric motor 102. Air is supplied from the environment by means of the air filter 113 by way of a non-return valve 104 to the three-cylinder star compressor 101. The three cylinder star compressor comprises three inlet valves 120, 121 and 122 and also three outlet valves 123, 124, 125. Consequently, it is possible to connect a multi-stage compressor concept. Air can be provided by way of the outlet valve 108 to the environment by way of a second non-return valve 105 or can be further guided to the switching valve device 130 by way of the throttle non-return valve 107 and the air dryer 106. Furthermore, a power limiting valve 103 and the ECU vent 114 is connected to the three-cylinder star compressor 101.

The switching valve device 130 uses the air supply of the air suspension system 111 by way of the in each case individual air suspension system valves 110, a pressure sensor 109 is connected between the switching device 130 and the air suspension valves 110. A pressure storage device 112 is used so as to further supply air by way of the switching valve device 130 to the air suspension system 111. Air can be discharged from the system by way of the manual vent 115.

Figure 3:
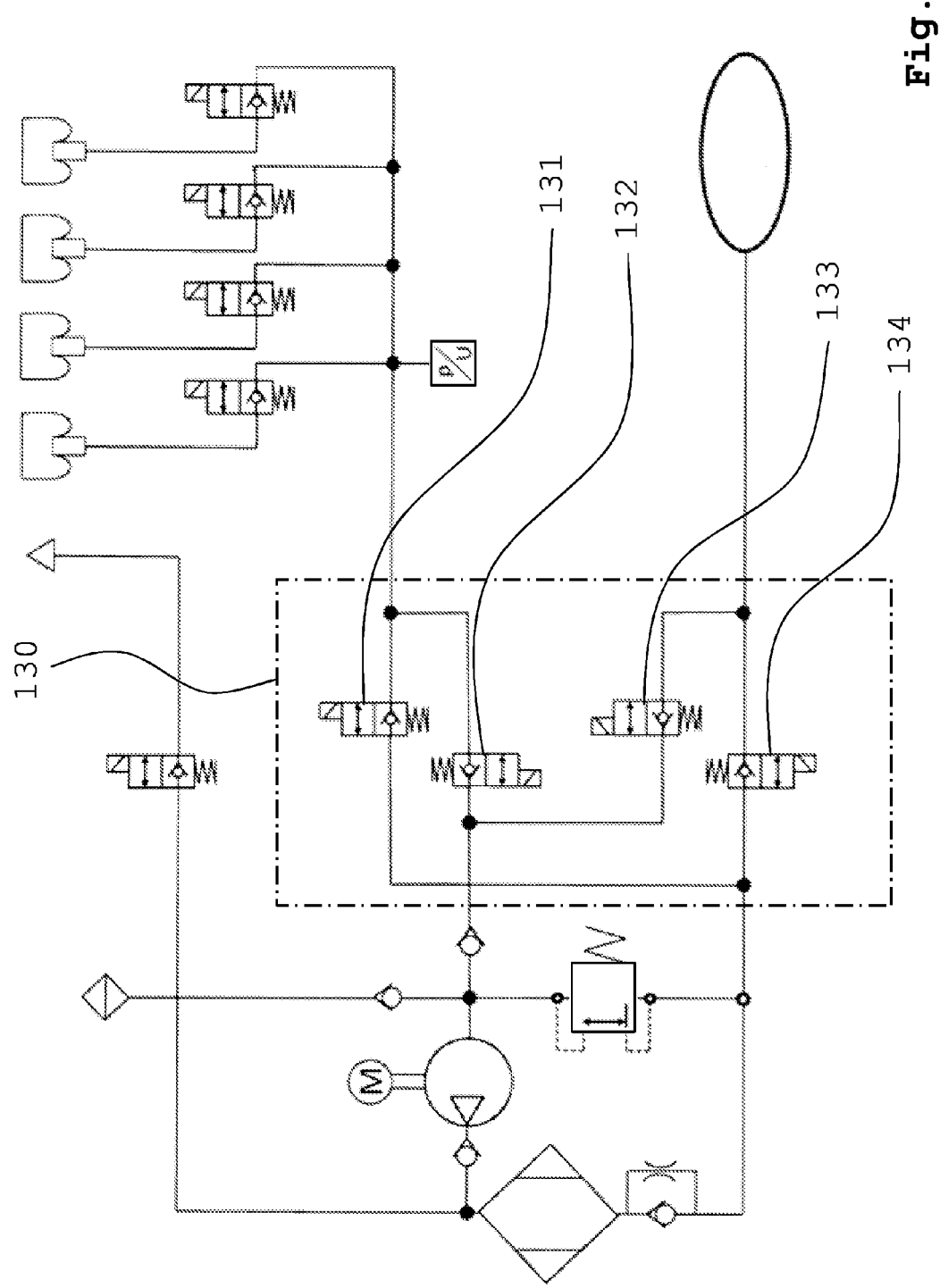
FIG. 3 illustrates a pneumatic circuit diagram having a switching valve device having four 2/2 directional control valves.

The pneumatic circuit diagram in FIG. 3 illustrates a switching valve device comprising four 2/2 directional control valves in the closed position. If the switching valves 131, 132, 133, 134 are in the opened position, a rapid exchange of air occurs between the pressure storage device and the air suspension system.

Figure 4:
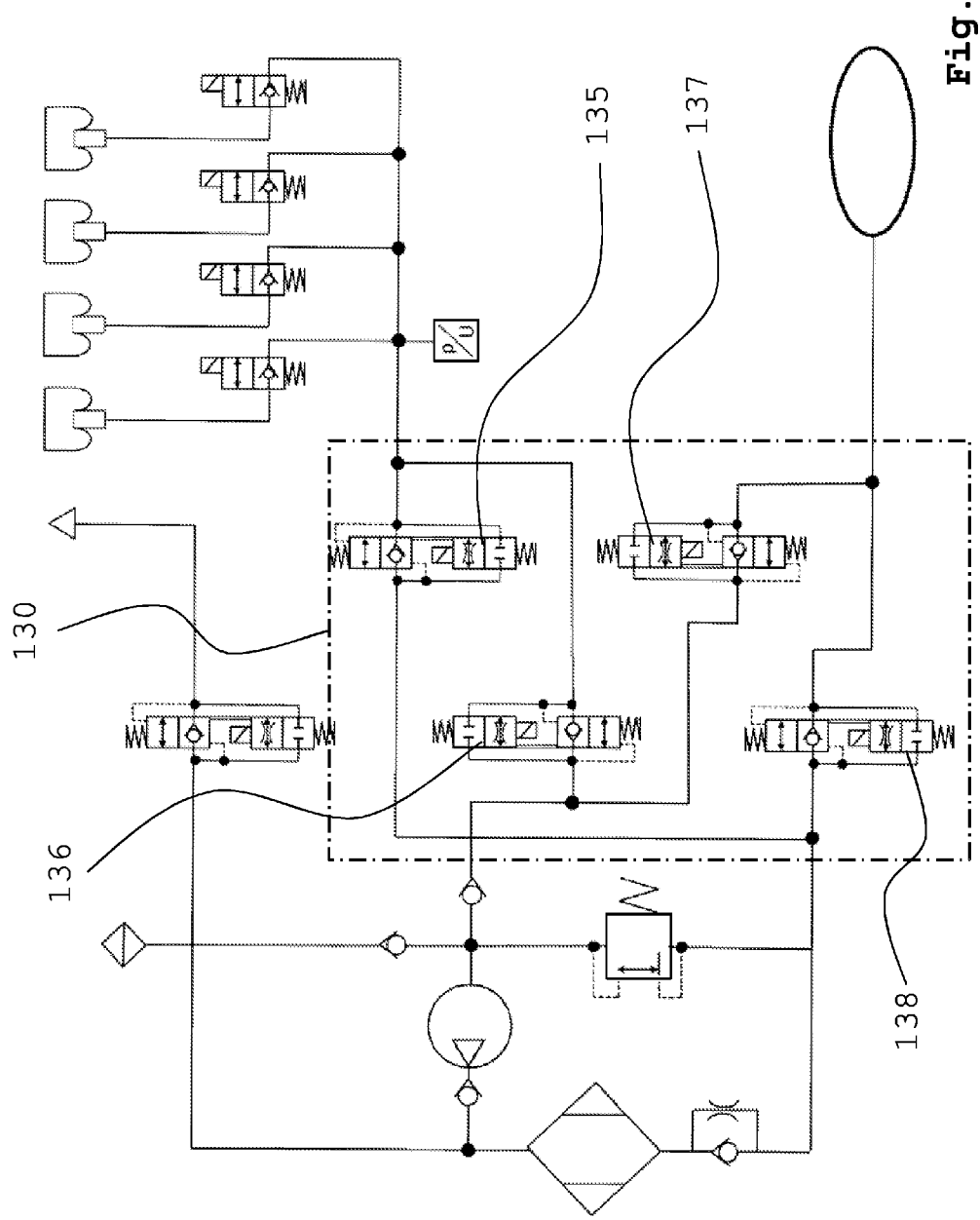
FIG. 4 illustrates a pneumatic circuit diagram having a switching valve device having four pilot-controlled 2/2 directional control valves.

A switching valve device having four pilot-controlled 2/2 directional control valves is illustrated in the pneumatic circuit diagram in FIG. 4.

In accordance with one embodiment, a functional unit is formed by means of integrating the components, air compressor having an electric motor, air dryer, pneumatic valves and electronic control device. The core of this functional unit is a pneumatic block on which all the further components are arranged. This pneumatic block includes one part of pneumatic valves and their mating part is arranged in an electronic control device. Furthermore, the electric motor and the air dryer are arranged on the pneumatic block. Pneumatic connectors are provided on the pneumatic block so as to connect further components, for example a pressure storage device. A compact structural unit is thus produced that is suitable for supplying air to air suspension systems for motor vehicles.

It is preferred that drive units of the pneumatic magnetic valves in particular comprising a core, sleeve, armature, resilient element and seal seat are fixedly integrated in the pneumatic block. The corresponding coils are preferably arranged separately from the pneumatic magnet valves in the electronic control device and can be actuated in an electromechanical manner. Said coils are plugged onto the drive units in a matched manner and are held in position in such a manner that compensates for tolerances, preferably by means of resilient elements.

It is preferred that a reciprocating piston compressor is provided as a compressor in the pneumatic block, said reciprocating piston compressor being driven by way of the electric motor that is attached to the pneumatic block. The integration of a reciprocating piston compressor in a block having common valves leads to the compact construction of the air supply unit.

The compressor that is embodied as a three-cylinder star compressor preferably comprises three pistons onto which the compressor forces are distributed. As a consequence, smaller torque fluctuations occur and a lower starting torque, which leads to a quieter compressor operation.

The compact construction of the three-cylinder star compressor makes physical contact with the central bearing arrangement on a crankpin. The resulting transverse force on the crankpin is reduced by virtue of this arrangement, as a result of which the motor bearing is loaded to a lesser extent and can be dimensioned as smaller. By virtue of the smaller compressor volume of the cylinder, smaller amounts of heat occur and can be dissipated in a simpler manner. These advantages of the three-cylinder star compressor produce a longer serviceable life and improved activation times, which leads to an increased and longer-lasting performance of the integrated air supply unit.

In accordance with a further preferred embodiment, the compressor is embodied as a two-piston compressor, wherein the pistons are mounted centrally on a crankpin. As a consequence, small torque fluctuations and a smaller startup torque likewise occur with the consequence of a quiet compressor operation.

The motor mounting arrangement is likewise loaded to a lesser extent as a result of being mounted on a crankpin, as a consequence of which it is possible to dimension said motor mounting arrangement as smaller. The smaller compressor volumes of the cylinders of the two-piston compressor lead to smaller amounts of heat that can be dissipated in a simpler manner. These advantages likewise produce a longer serviceable life and improved activation times with the consequence of a higher and longer-lasting performance of the integrated air supply unit.

The pneumatic block is preferably produced from aluminum and processed mechanically. The dissipation of heat is supported by means of this selection of basic material. As a consequence, it is possible to achieve a high level of quality and to produce various variants of the pneumatic block in a simple and cost effective manner. Pneumatic connections are produced by way of the ducts within the block between the components, compressor, air dryer, pneumatic valves and pneumatic connectors. Advantageously, by means of the ducts that are drilled in the pneumatic block, the pneumatic connections that are usually routed in the vehicle and connect the individual components to one another are omitted.

The housing of the electronic control device is preferably produced from a synthetic material and includes in particular an electronic connection to the vehicle electrical system. This is advantageously plugged in a sealed manner onto the pneumatic block so as to provide protection against environmental influences.

The electronic connector on the control device is used for all required signal lines and also for the entire current supply as a consequence of which the assembly expenditure and application expenditure are clearly reduced.

The motor control of the electric motor is now integrated into the air supply and occurs by way of semiconductor switches. Furthermore, the control device can also perform the usual tasks of air suspension systems such as level control and shock absorption control.

The internal electronic connections of the control device to the other components preferably occur by way of plug connections or press fit connections and are consequently not sensitive to interference. The magnetic valve coils are connected to the electronic end stages of the control device using short connecting contacts, as a result of which possible interferences are reduced. Consequently, the electromagnetic compatibility is improved. The short connections have the consequence that voltage drops across the lines are minimized and the power output of the magnetic valves increases. As a consequence, short and non-sensitive regulating circuits are used, as a result of which, in addition to push and hold controls, it is also possible to control the current controls, such as to produce a ramp profile. The magnetic valves can be used with higher, operationally more reliable push currents, as a result of which the construction volumes of the magnetic valves can be reduced.

A diagnostic function can be reliably produced for the motor control by means of the integrated air supply and operational data such as for example the "Operate compressor: yes/no" can be stored and evaluated. Owing to the fact that the otherwise usual electrical lines are omitted, the entire diagnosis behavior and failsafe behavior are improved. Interfering influences can be ruled out by means of the direct connection between the compressor, the magnetic valve block and the control device. All the connections and functions within the air supply unit can consequently be monitored.

In accordance with a further preferred embodiment, it is possible to calibrate components within the air supply unit when bringing it into operation and to store the settings in the electronic control device. This increases the functionality and accuracy of the integrated air supply unit.

Various types of sensors can be housed in the integrated air supply unit. In accordance with the application for air suspension systems these are usually pressure sensors, acceleration sensors and temperature sensors. Further sensors such as movement sensors and height change sensors can likewise be integrated.

In accordance with a further preferred embodiment, a pressure sensor is arranged in the pneumatic block that in particular is electrically contacted by the electrical control device by way of resilient contacts.

The integrated air supply unit is preferably used in air suspension systems for motor vehicles having the concept of a closed air supply. In the case of this air suspension system, the components include air compressors having an electric motor, air dryers, pneumatic valves and pneumatic connectors and also an electronic control device.

This air suspension system comprises an electronically controllable switching valve device that comprises four 2/2 directional control valves.

The valves that can be switched independently of one another are installed in the switching valve device in such a manner that the pressure difference is always in one direction and the higher pressure closes the valves. By virtue of the fact that it is not necessary for the resilient force to keep the seal seat closed against the pressure, resilient elements having smaller resilient forces can be installed, which in turn renders possible smaller valves and coils.

Various operating states are achieved for the air suspension system by means of the switching valve device.

The air suspension systems are filled from the pressure storage device without using the compressor when operating the closed air supply. All four switching valves are opened and the air suspension system is filled rapidly by means of the large cross section that is available. Likewise, the air suspension system is rapidly emptied back into the pressure storage device by way of all four opened switching valves.

In accordance with a further preferred embodiment, the switching valve device comprises four pilot-controlled 2/2 directional control valves.

These valves have the advantage of making large pneumatic powers switchable since the power is dependent upon pressure and volume current. The valves behave differently in dependence upon the through-flow direction or pressure difference. Opening holding pressures and closing holding pressures and also opening cross sections can thus be designed as needed. The overall usability is increased by means of using these valves. In addition, the installation volume can be considerably reduced with respect to known embodiments.

While the best modes for carrying out the invention have been described in detail the true scope of the disclosure should not be so limited, since those familiar with the art to which this invention relates will recognize various alternative designs and embodiments for practicing the invention within the scope of the appended claims.

The invention claimed is:

1. An integrated air supply unit, comprising:
an air compressor;
an electric motor;
an air dryer, wherein the air compressor together with an electric motor, the air dryer and multiple pneumatic connectors form a functional unit;
the functional unit is formed at least from a pneumatic block and an electronic control device; and
pneumatic valves are arranged in part in the pneumatic block and in part in the electronic control device, the air compressor is arranged in the pneumatic block and is driven by way of the electric motor, the electronic control device is arranged at a side of the pneumatic block opposite to the electric motor.

2. The integrated air supply unit of claim 1, wherein drive units of the pneumatic valves are arranged separately in the pneumatic block and magnetic valve coils of the pneumatic valves are arranged separately in the electronic control device and the magnetic valve coils can be positioned in a joined together state by way of tolerance-compensating elements.

3. The integrated air supply unit of claim 1, wherein the air compressor is a three-cylinder star compressor.

4. The integrated air supply unit of claim 3, wherein the three-cylinder star compressor is mounted centrally by way of a crankpin.

5. The integrated air supply unit of claim 1, wherein the air compressor is a two-piston compressor.

6. The integrated air supply unit of claim 5, wherein the two-piston compressor is mounted centrally by way of a crankpin.

7. The integrated air supply unit of claim 1, wherein pneumatic block ducts extend as pneumatic lines and connect the air compressor, the air dryer, the pneumatic valves and the pneumatic connectors to one another.

8. The integrated air supply unit of claim 1, further comprising a plurality of sensors, which are at least one of: a pressure sensor, an acceleration sensor, and a temperature sensor, and are integrated into the air supply unit.

9. The integrated air supply unit of claim 8, wherein one of the sensors is a pressure sensor, wherein the pressure sensor is arranged in the pneumatic block.

10. The integrated air supply unit of claim 9, wherein the pressure sensor can be electrically contacted by the electronic control device by way of tolerance-compensating elements.

11. The integrated air supply unit of claim 1, wherein the electronic control device comprises an electronic connector and the integrated air supply unit connects to at least one vehicle electrical network.

12. The integrated air supply unit of claim 1, wherein the air supply unit is assembled on a vehicle.

13. The integrated air supply unit of claim 12, wherein the vehicle has a switching valve device, the switching valve device comprises one of: four 2/2 directional control valves, and four pilot-controlled 2/2 directional control valves.

14. An integrated air supply unit comprising:
an air compressor;
an electric motor;
an air dryer, wherein the air compressor together with an electric motor, the air dryer and multiple pneumatic connectors form a functional unit;
wherein the functional unit is formed at least from a pneumatic block and an electronic control device;
wherein pneumatic valves are arranged in part in the pneumatic block and in part in the electronic control device; and
wherein drive units of the pneumatic valves are arranged separately in the pneumatic block and magnetic valve coils of the pneumatic valves are arranged separately in the electronic control device and the magnetic valve coils can be positioned in a joined together state by way of tolerance-compensating elements.

* * * * *